(12) United States Patent
O'Connor et al.

(10) Patent No.: US 7,127,058 B2
(45) Date of Patent: Oct. 24, 2006

(54) MANAGING COMMUNICATIONS IN A CALL CENTER

(75) Inventors: Neil O'Connor, Lackagh (IE); Thomas Moran, Kingston (IE)

(73) Assignee: Nortel Networks Limited, St. Laurent (CA)

( * ) Notice: Subject to any disclaimer, the term of this patent is extended or adjusted under 35 U.S.C. 154(b) by 364 days.

(21) Appl. No.: 10/108,686

(22) Filed: Mar. 27, 2002

(65) Prior Publication Data

US 2003/0185379 A1    Oct. 2, 2003

(51) Int. Cl.
*H04M 3/523* (2006.01)

(52) U.S. Cl. .......................... 379/265.01; 379/265.07; 379/265.09; 379/266.1

(58) Field of Classification Search .............................. 379/265.01–266.1, 266.01
See application file for complete search history.

(56) References Cited

U.S. PATENT DOCUMENTS

| | | | |
|---|---|---|---|
| 5,675,637 A * | 10/1997 | Szlam et al. ........... 379/142.17 |
| 6,058,435 A * | 5/2000 | Sassin et al. ............... 719/331 |
| 6,170,011 B1 * | 1/2001 | Macleod Beck et al. ... 709/224 |
| 6,230,197 B1 * | 5/2001 | Beck et al. .................. 709/223 |
| 6,377,944 B1 * | 4/2002 | Busey et al. .................... 707/3 |
| 6,614,895 B1 * | 9/2003 | Impey et al. .......... 379/127.01 |
| 6,724,887 B1 * | 4/2004 | Eilbacher et al. ....... 379/265.03 |
| 6,823,054 B1 * | 11/2004 | Suhm et al. ................. 379/134 |
| 2001/0043697 A1 * | 11/2001 | Cox et al. .............. 379/265.06 |
| 2002/0067821 A1 * | 6/2002 | Benson et al. ......... 379/265.02 |
| 2003/0198336 A1 * | 10/2003 | Rodenbusch et al. .. 379/265.02 |

* cited by examiner

Primary Examiner—Harry S. Hong
(74) Attorney, Agent, or Firm—Barnes & Thornburg LLP

(57) ABSTRACT

A communications management tool for a call center maintains a record of threads of communications of diverse media types (e.g. voice calls, emails and faxes) relating to particular issues, and analyses new communications to automatically identify possible matches with existing threads. In this way the efficiency of the agents at the center is increased and the management of the call center can be provided with data recording agent performance and efficiency in dealing with particular issues.

18 Claims, 7 Drawing Sheets

MANAGING COMMUNICATIONS IN A CALL CENTER

FIELD OF THE INVENTION

The present invention relates to call centres and in particular to multimedia call centres, i.e. centres having the capability to handle communications involving more than one electronic medium.

The invention has particular application in call centres which handle telephone calls and emails.

BACKGROUND OF THE INVENTION

Traditional call centres allow agents to deal with queries, complaints or other issues raised by remote users (referred to herein as "customers", irrespective of whether they are actually buying products or services from the call center organisation) who telephone the call centre. Sophisticated call centre software will often filter calls through a series of interactive voice response (IVR) menus to enable certain queries to be dealt with automatically and other queries to be routed to the most appropriate agent or group of agents using "skillset routing".

The call centre software also provides reporting functions allowing the management of the call centre to assess the performance and efficiency of individual agents and of groups of agents in terms of the time taken to respond to and deal with particular calls.

Multimedia call centres are emerging, largely as a consequence of the fact that many call centre customers will have a number of communication media at their disposal. For example, a customer who contacts a call centre initially by submitting a web page form when navigating a website may wish to follow up on this query by email and/or by speaking to an agent. (Of course the communications need not be and generally are not, unidirectional; contact can be made initially by the agent, such as in telemarketing call centres, and emails sent by customers will often be responded to by return email from the agent.)

Whereas conventional call centre management software is well adapted to monitor and generate statistics relating to agent performance in voice calls, it can be more difficult to provide useful statistics in multimedia call centres. For example, the management of the call centre may be interested not only in response times, but also in the efficiency of the agent as measured by some metric of success. In a call centre dealing primarily with complaints, the metric may be the customer satisfaction rating when the complaint has been disposed of, as measured by a follow-up survey. In call centres having sales of a product or service as their primary goal, the metric may be the number of sales or the financial value of sales attributable to the agent, in which case the amount of time spent dealing with a customer will be partly evaluated on the sales achieved. In telemarketing operations the success metric may the proporion of contacts who agree to receive a sales representative at their premises.

Tracking time-based statistics and success-based statistics across a number of diverse media imposes additional demands on the call centre management and reporting software. Of particular difficulty is the problem of identifying a number of distinct, time-separated communications made using different media types, as being related to a single case or transaction.

It would therefore be desirable to provide call centre management methods and systems which provide enhanced abilities in this regard.

SUMMARY OF THE INVENTION

The invention provides a method of managing communications in a call centre between an agent at the call centre and a customer of the centre. The method involves the steps of:

a) maintaining a database of entries which identify sets of communications (threads) related by one or more common parameters;

b) analysing a new communication to determine a match between the communication and an existing thread;

c) presenting the agent with information about the matching thread(s) when the new communication is active at the agent's terminal; and d) updating the database entry relating to the (or each) matching thread with information regarding the new communication.

By analysing new communications, either emanating from the agent or, more commonly, arriving at the call centre, it is possible to automatically identify certain parameters which enable a match to be made between the new communication and existing threads of communication having a similar or the same subject.

In this way, the grouping of communications, particularly using different media, can be improved, leading to better reporting and management of the call centre, and leading to improved agent efficiency.

Preferably, if more than one match is determined in step b), the agent is provided in step c) with a list of matches. This then enables the agent to select a match (e.g. the correct thread or the closest matching thread). Then in step d) the new communication is identified with the selected thread (and not the other possible matches presented to the agent).

By providing the agent with the option to select a particular thread from a number of presented threads, the agent can subsequently access information relating to this thread, bringing him or her up to speed more quickly. It also enables the agent to use human intervention to determine a match using experience and recall The agent can also be presented with the option to create a new entry in the database identifying the new communication as a new set or thread.

As the identification of a possible match or matches is automated and presented to the agent, errors will inevitably occur, so it may be important to provide the agent with the option to select a new thread if in fact the subject-matter of the communication is unrelated to existing threads which may involve the same customer and a similar subject.

The new communication can, depending on the needs and capabilities of the call centre, be of a communication type selected from voice calls, facsimiles, emails, web page submissions, internet chat sessions, wireless messages (e.g. text messages such as SMS (short messaging system) messages or pager messages), interactive voice response (IVR) telephone sessions, and voicemail messages.

This list of communication types is not comprehensive and emerging technologies will undoubtedly evolve allowing new forms of communication between customers and multi-agent centres of some sort. It is envisaged that the invention would be equally applicable to such emerging technologies, assuming that they share basic common features with those identified above.

Preferably, some of the threads in the database include communications of two or more of the above communication types.

The invention is particularly of use where the new communication is of a first communication type (e.g. a voice call) and the match is made with a thread consisting of communications of one or more other communication types (e.g. a thread conducted by email up to this point).

A particular difficulty exists in the current technology in matching a new communication of one type with related communications of other media types, since the record of the other media types may not include information allowing a match with the new communication to be identified. The invention provides a common thread ID which can be referenced across different communication types, and allows other information identifying the origin or nature of the communication to be matched with existing information regarding previous communications.

If the communication type is a voice call the parameter used to determine a match can be, for example:
 the calling line identification of an incoming call to the centre,
 the dialled number of an outgoing call from the agent,
 a sequence of dual tone multi frequency (DTMF) tones (i.e. keypad tones) entered by the customer during the call,
 a characteristic sound transmitted by the customer (e.g. by analysing the words spoken by the customer in real time or offline, a keyword or number might be identified allowing a match),
 the acoustic fingerprint of the customer's voice, or
 a combination of these parameters.

If the communication type is a facsimile the parameter used to determine a match can be, for example:
 the calling line identification of an incoming call to the centre,
 the dialled number of an outgoing call from the agent,
 a sequence of DTMF tones entered by the customer during the transmission of the facsimile,
 a graphical recognition of information forming part of the facsimile, or
 a combination of these parameters.

If the communication type is an email the parameter used to determine a match can be, for example:
 an email address contained in the message header (e.g. in the "to:", "from:", "cc:", or "reply to:" parts of the header),
 an IP address in the message header,
 a distinctive identifier in the subject line of the email, or in the body of the email or in an attachment to the email message, or
 a combination of these parameters.

If the communication type is a web page submission the parameter used to determine a match can be, for example:
 an IP address recorded during the web page submission process,
 a distinctive identifier entered in a field of the web page submission, or
 a combination of these parameters.

If the communication type is an internet chat session the parameter used to determine a match can be, for example:
 an IP address recorded during the session,
 an email address recorded during the session,
 a distinctive identifier entered by a party during the session, or
 a combination of these parameters.

If the communication type is a wireless message the parameter used to determine a match can be, for example:
 the originating number of an incoming message to the centre,
 the dialled number of an outgoing message from the agent,
 a message centre number included in the message,
 a distinctive identifier forming part of the message, or
 a combination of these parameters.

If the communication type is an interactive voice response telephone session the parameter used to determine a match can be, for example:
 the originating number of an incoming call to the centre,
 the dialled number of an outgoing call from the agent,
 a sequence of DTMF tones entered by the customer during the session,
 a distinctive selection of menu choices made by the customer during the session,
 a characteristic sound transmitted by the customer,
 the acoustic fingerprint of the customer's voice, or
 a combination of these parameters.

If the communication type is a voicemail message the parameter used to determine a match can be, for example:
 the originating number of the incoming call resulting in the voicemail message,
 a sequence of DTMF tones entered by the customer during the session,
 a distinctive selection of menu choices made by the customer prior to or after leaving the message,
 a characteristic sound transmitted by the customer,
 the acoustic fingerprint of the customer's voice, or
 a combination of these parameters.

The invention also provides a method of presenting communications to an agent at a call centre terminal, involving the steps of:
 a) providing the agent with an incoming communication;
 b) providing the agent with one or more identifiers of previous threads related by one or more common parameters to the incoming communication; and
 c) enabling the agent to confirm or reject the association between the incoming communication and one or more of the previous threads.

This aspect of the invention provides an enhanced interface for the agent to operate with a means of improving agent efficiency and of maintaining better statistics and records in the call centre. It will be appreciated that it is possible for the selection of a new thread or an existing thread to be optional for the agent or mandatory for the agent, depending on the requirements of the call centre in question.

The method can also provide the agent with the option to assign the incoming communication as the first element of a new thread.

In a further aspect the invention provides a communications management apparatus for use in a call centre, comprising:

a) a database for recording entries identifying threads of communications;
b) a communications analysis element for analysing a new communication to determine a match between the communication and one or more matching threads;
c) an agent interface for presenting an agent at a terminal with information relating to the matching threads when the new communication is active at the terminal; and
d) a database management tool for updating the database entry relating to the (or each) matching thread with an identification of the new communication.

The invention also provides a database having a number of entries relating to communications between one or more agents of a call centre and one or more customers of the call centre, each entry including:

a) an identification of a customer (or group of customers) such as individuals in a client company of the call centre) involved in a thread of one or more communications with the call centre;
b) a record of the communications in the thread; and
c) one or more parameters relating to the thread allowing new communications involving the customer or group of customers to be compared with and matched to the thread;

in which at least some of the entries in the database include a record of a communication of a first media type and a record of a communication of a second media type.

This database provides a particularly advantageous means of classifying previous communications in threads and matching new communications to the existing threads.

In another aspect of the invention there is provided a computer program which causes a computer to carry out the steps of:

a) maintaining a database of entries identifying sets of communications related by one or more common parameters;
b) analysing a new communication between the customer and the centre to determine a match between a parameter of the communication and one or more matching sets in the database;
c) upon determining said match, presenting the agent with information relating to said one or more matching sets when said new communication is active at a terminal of the agent; and
d) updating the database entry relating to the or each matching set with an identification of said new communication.

The computer program can be run on a number of connected computers, so that different computers execute different tasks in the sequence as appropriate.

The skilled person will also appreciate that the computer program can be embodied in electrical circuitry or firmware can be stored in the working memory of a computer or in a media accessible by the computer, or can be recorded on a portable media or embodied in an electrical signal.

In a further aspect the invention provides a multimedia call centre having:

a) a number of multimedia agent terminals;
b) a communications distribution system for assigning or presenting communications to the terminals;
c) a communications channel for each of the media types enabling communications between agents at the terminals and remote customers of the call centre (e.g. an internet connection for emails and a connection to a telephone network for voice calls), and
d) a communications management apparatus, which includes:
   i) a database for recording entries identifying threads of communications;
   ii) a communications analysis element for analysing a new communication to determine a match between the communication and one or more matching threads;
   iii) an agent interface for presenting an agent at a terminal with information relating to the matching threads when the new communication is active at the terminal; and
   iv) a database management tool for updating the database entry relating to the (or each) matching thread with an identification of the new communication.

BRIEF DESCRIPTION OF DRAWINGS

The invention will now be illustrated by the following descriptions of embodiments thereof given by way of example only with reference to the accompanying drawings, in which.

DETAILED DESCRIPTION OF PREFERRED EMBODIMENTS

Figure 1:
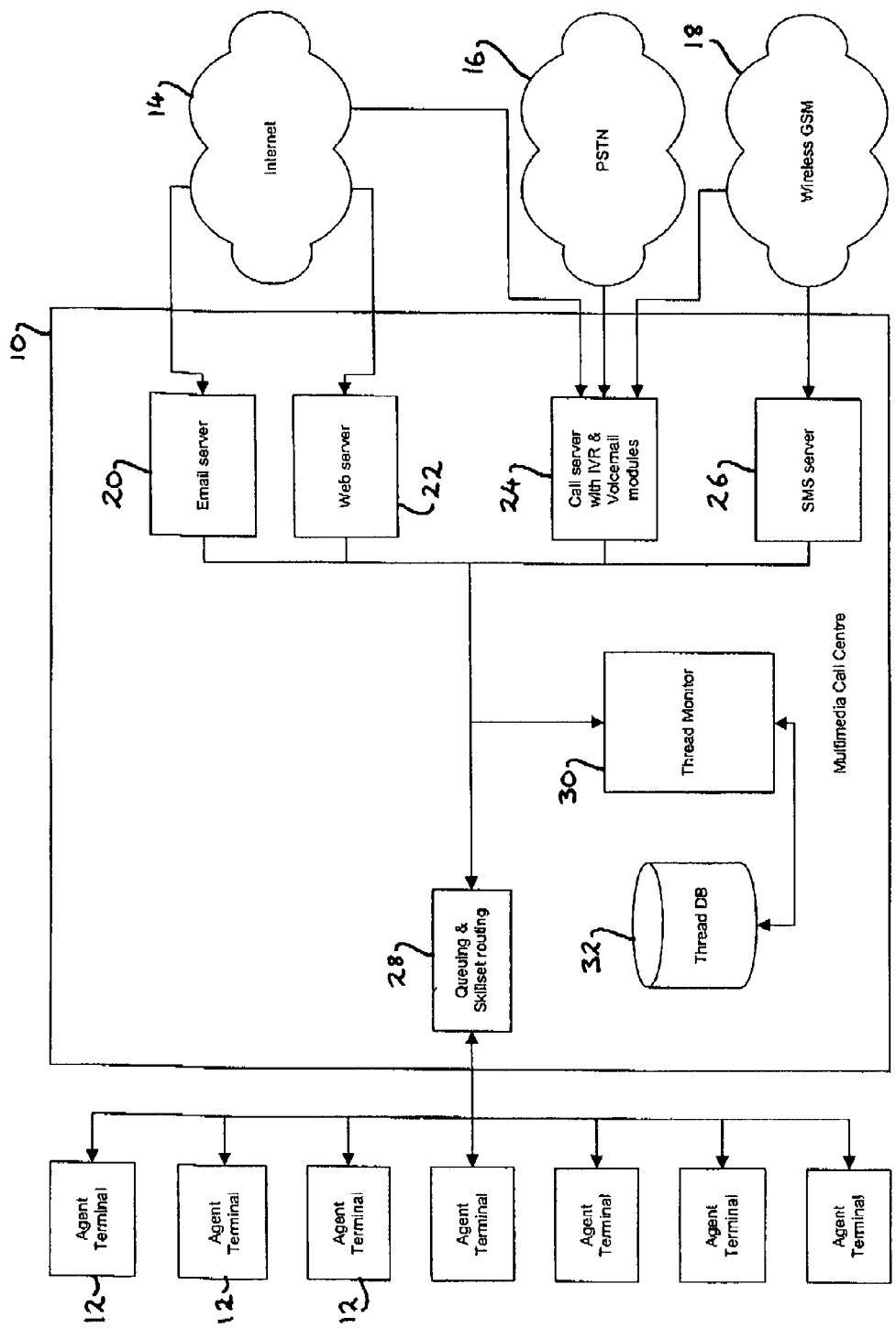
FIG. 1 is a block diagram of a call centre according to the invention.

FIG. 1 shows a call centre management system 10 enabling communication between a plurality of agent terminals 12 and remote customers (not shown) communicating with the call centre by communications networks such as the Internet 14, the public switched telephone network (PSTN) 16 and a wireless cell phone network 18 such as the global system for mobiles (GSM) network. The call centre 10 includes a number of servers for handling incoming and outgoing communications of different media types. Thus, an email server 20 and a web server 22 provide interfaces with the Internet 14. A call server 24 having an interactive voice response (IVR) module and an integrated or connected voicemail server provides an interface with the PSTN network 16, and an SMS server 26 receives and sends text messages via the GSM network 18.

Whereas conventional call centres will route incoming communications to appropriate agents using a queuing and skillset routing function 28, the agent is not in a position to determine in advance whether the new communication relates to an ongoing issue.

Furthermore, the routing mechanism 28 in a conventional call centre cannot automatically route an email relating to a matter already discussed with a particular agent by telephone, unless the email is addressed to the agent. The invention provides a thread monitor apparatus 30 which analyses communications between customers and the call centre and attempts to determine matches with existing threads of communications details of which are stored in a thread database 32.

Figure 2:
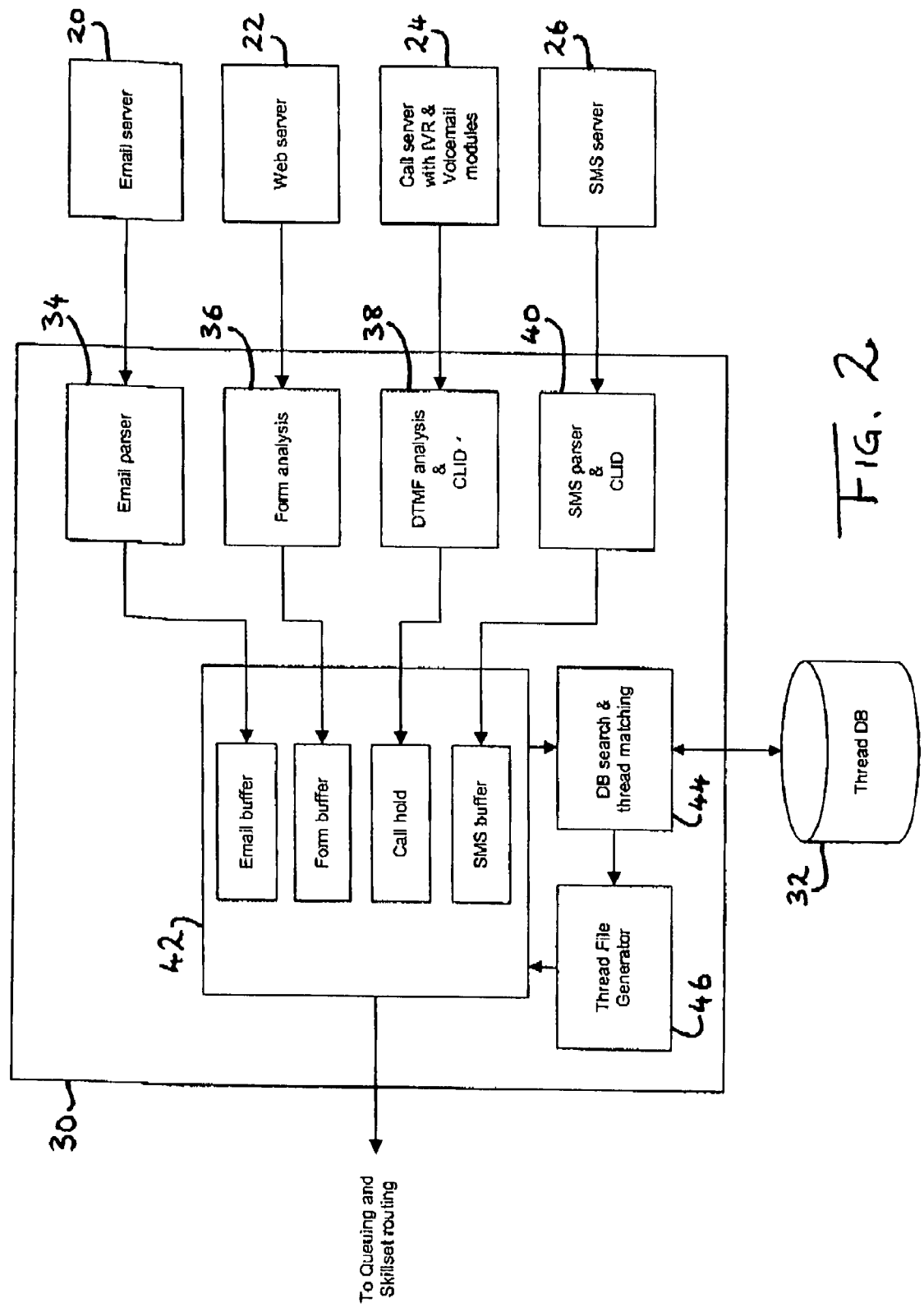
FIG. 2 is a block diagram of the communications management apparatus of FIG. 1.

FIG. 2 shows the thread monitor 30 in greater detail. A number of communications analysis modules (email parser 34, form analysis module 36, DTMF analysis and CLID identification unit 38, and SMS parser and CLID identification unit 40) are connected to the respective servers 20, 22, 24, 26. As will be detailed more fully below, these communications analysis modules analyse the communications received at the call centre (and optionally outgoing communications) for information enabling a match to be made with earlier communications, possibly of a different media type, which may relate to the same issue (in the sense that they form a "thread" of communication).

Before the communications are forwarded to queuing and skillset routing 28 (FIG. 1) they are held in a buffer unit while a database search and thread matching application 44 interrogates the thread database 32 for matches between the information extracted by the analysis units 34, 36, 38, 40 and the information stored in the thread database 32. Upon one or more matches being generated, a thread file generator 46 sends information identifying the thread(s) to the agent, so that the agent will be provided, upon receiving the communication from a queue, with information identifying the thread to which the communication has been determined to belong (or allowing the agent to select the correct one of a number of possible matching threads).

Figure 3:
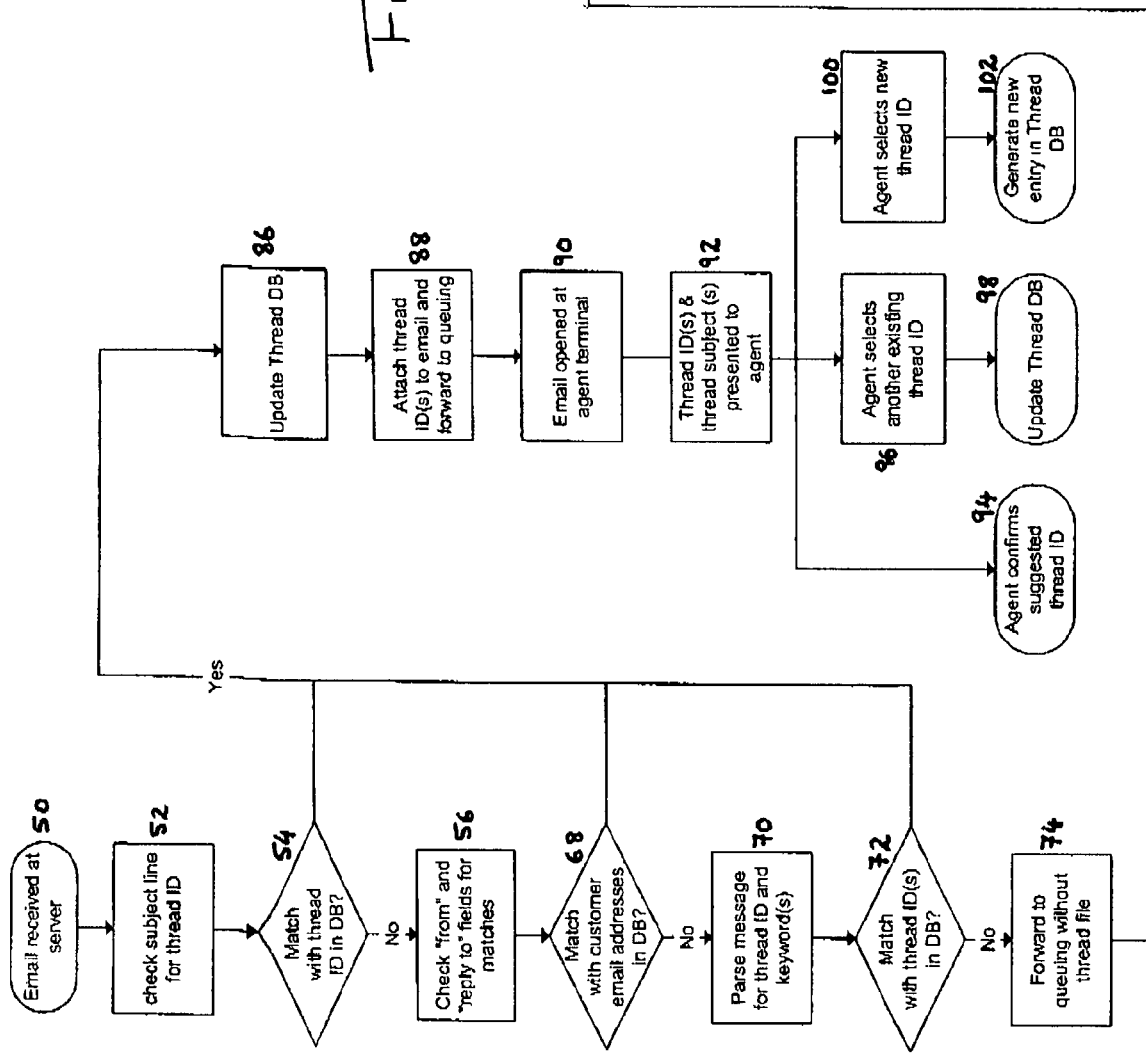
FIG. 3 is a flow chart illustrating a method of managing an incoming mail communication to the call centre.

FIG. 3 shows the steps of an exemplary method of the invention, carried out in relation to an incoming email message.

In step 50, an email is received at email server 20. This is passed to the email parser 34 and in step 52 the parser first checks the subject line of the email for a thread ID number. Such a thread ID number may be present if the email from the customer is a reply to an earlier email sent to the customer by an agent of the sender (since the agent will most likely have included the thread ID number in the subject line of the email). The thread ID can also be contained in the subject line if the customer has been requested to use this thread ID number as a reference in some other interaction with the call centre (e.g. a voice call to an agent, an automatically generated thread ID provided in an IVR session, or a thread ID appearing on a web page generated when the customer visited a website relating to the call centre).

If it is determined in step 54 that the subject line does not contain a valid thread ID, the email parser checks addresses in the email header such as the "from" and "reply to" fields, in step 56.

Figure 4:
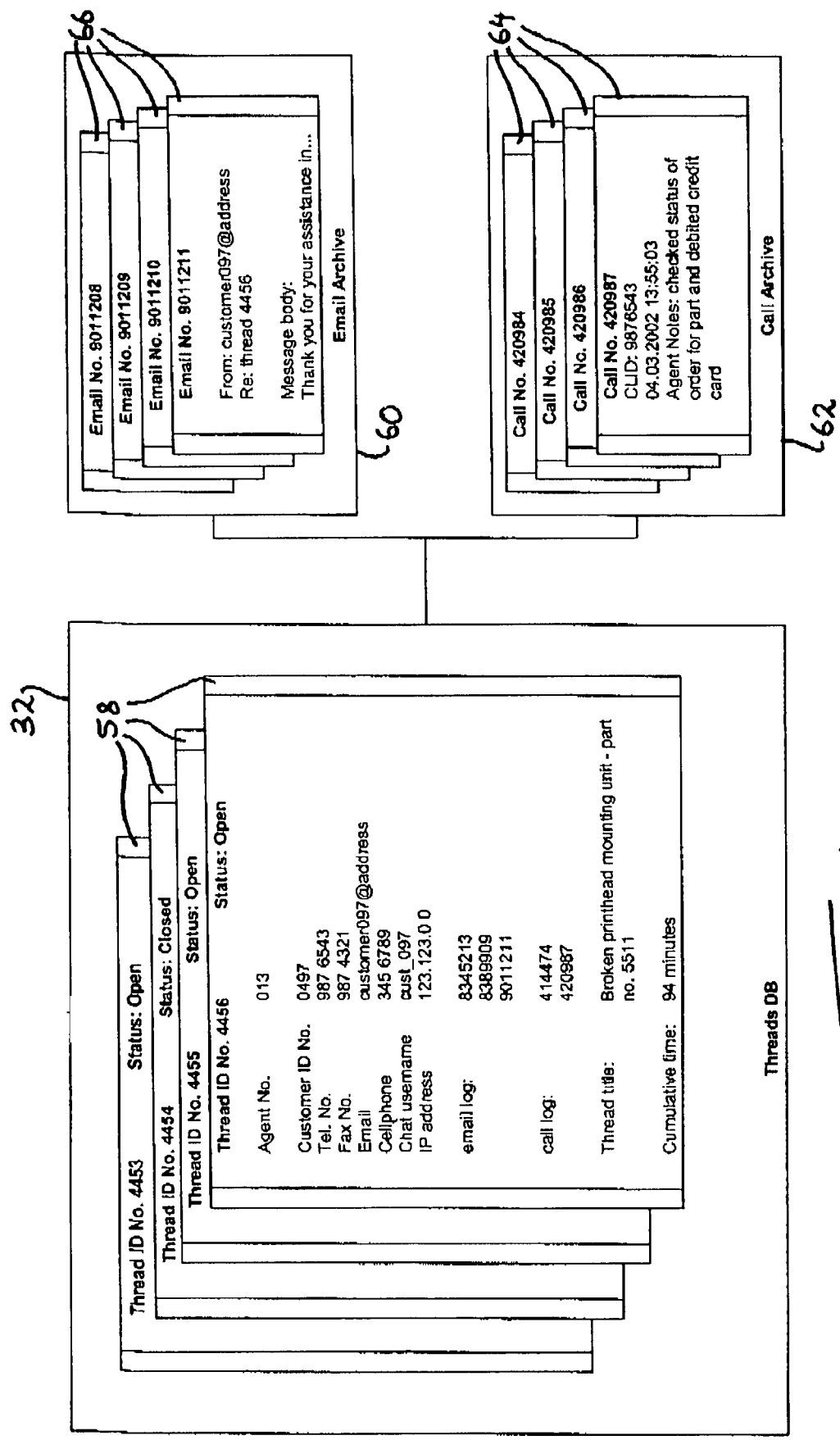
FIG. 4 shows the structure of a thread database and associated message archives.

Referring additionally to FIG. 4, an example of information contained in a thread file 58 of the thread database 32 can be seen. In addition to the thread ID number (4456) there is an identification of the agent dealing with this thread (013), a listing of various recognisable communication identifiers relating to the customer, including the email address which may appear in the header of the email, and a listing of previous communications relating to this thread. In the illustrated record 58, three previous emails are identified as relating to the thread and two previous calls are indicated as relating to the thread. Thus, the record 58 contains a pointer to an email archive 60 containing an archive of all emails to the call centre (only a few of which are illustrated for simplicity), and a pointer to a call archive 62 in which details of calls made to the call centre are similarly stored. The call records 64 in the call archive can include information such as the originating phone number (CLID), a time stamp, and notes made by the agent at his or her terminal during or shortly after the call. The records 66 in the email archive can simply be the email messages themselves.

The thread record 58 in the illustrated embodiment also includes a title which can be presented to the agent terminal to facilitate identification of the correct thread, and cumulative time spent on the thread to date for subsequent reporting purposes. Further or different information could of course be contained in the thread ID record 58.

Reverting to FIG. 3, in step 68 the database search facility 44 searches for matches between addresses in the email header and the records 58 of thread database 32. Again it should be pointed out that the possibility of obtaining such a match is not limited to cases in which there have been prior communications by email. The email address of the customer may appear in a thread record as a result of details of submitted by the customer in a web form or provided orally to an agent of the call centre in a voice call. In this way, the new email can be matched with existing threads relating to this customer even if email has not been used in the thread previously.

If no match is determined in step 68, the email parser 34 may proceed to parse the body of the message to search for the thread ID number and one or more key words in step 70. The sophistication and usefulness of this searching algorithm depends on a number of factors including the distinctiveness of the key works searched for and the number of records in the thread database 32. For example, the word "complaint" appearing in the body of an email message may be of little significance if a large number of the thread titles identify the subject of the thread as being a complaint about some matter. However, if the search facility searches for the word "part" within one or two words of a four digit number, this may enable the searching algorithm to locate all threads relating to enquiries about that particular part number, which may be of assistance.

If the searching algorithm cannot determine a unique match in step 72 or a useful (i.e. small) number of matches, the email will be forwarded for queuing and skillset routing without any identification of a thread, step 74.

The process then proceeds to step 76, when the email is selected from a queue or is automatically opened at an agent terminal. If the agent considers that the email may relate to an existing thread, then the agent can opt to search for and select an existing thread in step 78. For example, the agent may recognise the subject-matter of the email or the company name or personal name of the addressee (who may have sent the email from a different address to that stored in the call centre databases), so that the agent recognises that this does not represent a new thread. A search interface is provided for the agent to access and search the thread database, and upon selecting and confirming an existing thread, in step 80 the thread record 58 selected by the agent is updated with a pointer to the email record 66 of this new email currently open at the agent terminal (which is automatically stored in the archive 60). When the thread record is updated with a pointer to this message in the email archive 60, it may also be updated with additional information such as the email address which can be added to the customer's record.

If the agent determines, upon opening the email in step 76, that there is unlikely to be an existing thread, the agent may opt to select a new thread ID, step 82. The thread database is then updated in step 84 by generating a new entry in which the agent may fill in details of the customer or these details may be automatically added from an existing customer file (since a new thread does not necessarily relate to a new customer or customer). The thread title can be extracted from the subject line of the email or the agent may insert a thread title. The new database entry also includes a pointer to the copy of this email as stored in the email archive 60.

If, on the other hand, the database search in steps 54, 68 or 72 locates one or more matches between the email message and existing thread records 58, the thread database for each record is updated with a pointer to this email message, step 86. The thread file generator 46 (FIG. 2) then appends a small file containing the thread ID number and title from the relevant thread record(s) 58 to the email and forwards the email with this attachment for queuing and routing, step 88.

The routing software can use the thread ID(s) in the attachment to determine from the thread record(s) which agent(s) should receive the email since each thread record includes an identification of the agent dealing with the thread.

When the agent opens the email in step 9O, the client software at the agent terminal checks for an attached thread file in step 92 and presents the (or each) thread ID and subject or title to the agent for confirmation. If a single matching thread was identified in step 54, 68 and 72, then the agent can confirm the appropriateness of the thread, step 94, and continue to deal with the email in the normal way. The client software at the agent terminal can then record the time spent dealing with the email, and when the email has been disposed of (e.g. replied to, forwarded or closed) the thread database may be updated with a new cumulative time for the thread. If, when the agent disposes of the email, the matter is considered to be closed, the status, as recorded in the header of the thread ID file 58 can be changed from "open" to "closed" to assist on future thread matching and in reporting. (The status need not be simply "open" or "closed" and appropriate other status identifiers can be selected, such as "product shipped" or "sales appointment arranged".)

If more than one thread has been identified, one of these may be suggested as the closest match, in which case again the agent may confirm the correctness of the suggested thread ID in step 94.

If no thread is considered to be closer than the others, or if the agent considers that a thread from the thread file other than that suggested as the closest match is the appropriate thread, then the agent interface allows the agent to select this other existing thread, step 96. In this case, the thread database will be updated by removing the pointer to the email message from each of the deselected threads. An alternative approach, where the matching steps provide a number of possible matches, is to omit step 86 and to update a single selected record, step 98, only after selection or confirmation by the agent in step 96.

Because the automated matching may erroneously consider that the new email communication presented to the agent is step 92 relates to an existing thread (whereas in fact it relates to a new subject), the agent is provided with a third option, to select a new thread ID, step 100. A new entry is then generated in the thread database, step 102, in the same manner as in steps 82 and 84, and this entry is updated with a cumulative time spent dealing with the thread when the email is disposed of.

Figure 5:
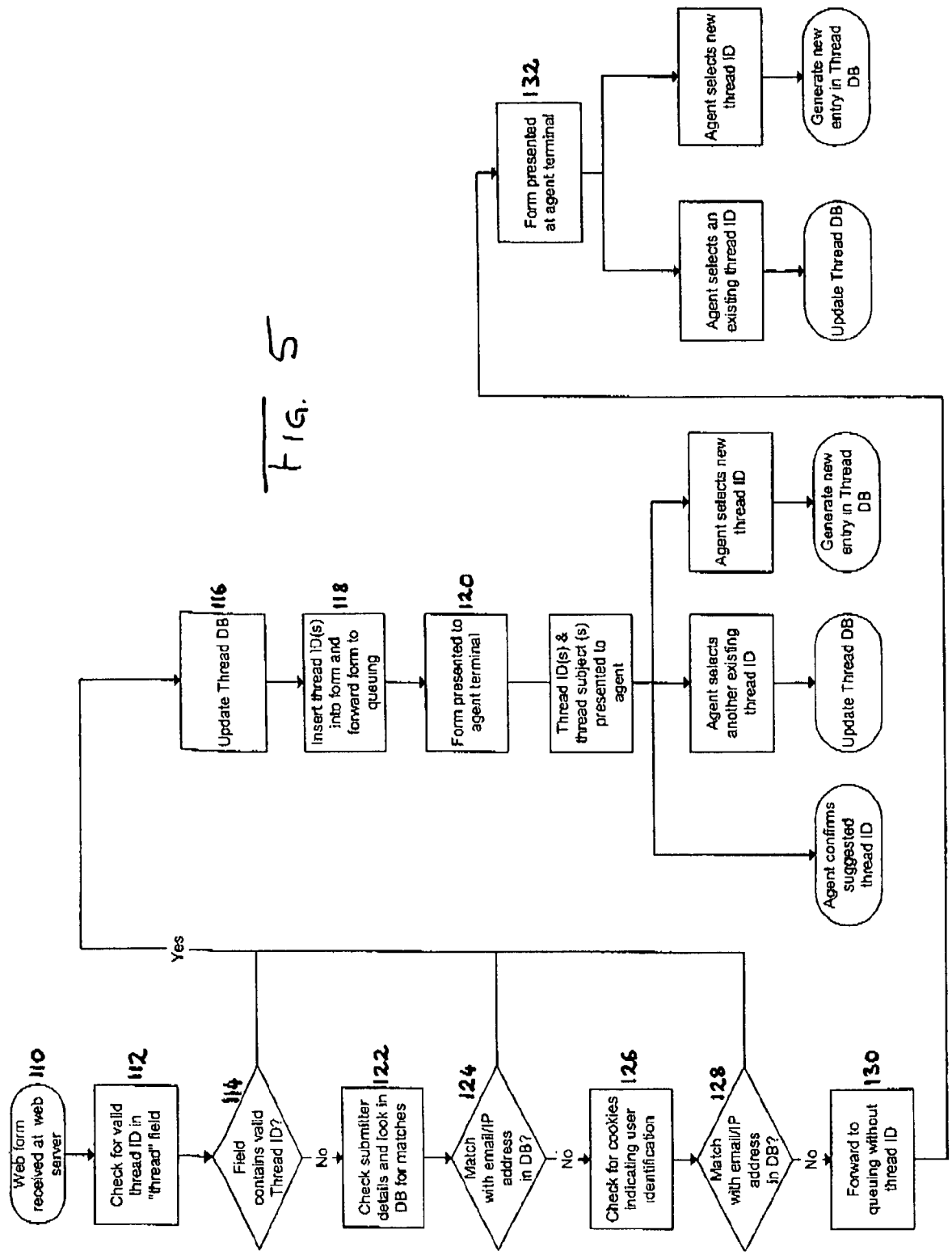
FIG. 5 illustrates a method of the invention as applied to web forms submitted by a customer.

FIG. 5 illustrates the process steps followed when the new communication is a web form. As many of the steps are generally similar to the steps of FIG. 3, only those requiring expansion will be specifically referred to by reference numerals.

In this scenario, the customer completes a web form which may contain an enquiry, order, comment or complaint, for example. The web form may be generated and processed using active server pages, Java server pages or a cgi function.

The web form is processed by the web server 22, step 110, and forwarded to the form analysis unit 36 (FIG. 2). Assuming that the web form has a field in which the customer can insert a thread ID, the analysis unit 36 checks, in step 112 for a valid thread ID. If such an ID is found in a matching step 114, that thread record is updated in step 116, step 118 is skipped as unnecessary and the form is presented to the agent in step 120 allowing the agent to confirm the thread ID, select another existing thread ID or select a new thread, as previously described.

If no valid thread ID is found in step 114, details relating to the individual who submitted the form are checked for a match, steps 122, 124. Examples of such submitter details include the email address which the customer may insert in the form for response purposes, a name or credit card number, or an IP address logged by the web server when the form is submitted. If one or more matches with existing thread records is determined in step 124, then these records are updated in step 116, and the thread file generator 46 (FIG. 2) inserts a thread ID into the form, step 118 and the process continues to step 120 as previously described.

If no useful submitter details are located in the form, and the customer has remained online, the form analysis unit 36 may prompt the web server 22 to check the customer's computer for a cookie which may identify the customer from a previous web session, step 126. If this cookie enables the customer to be matched with an email or IP address in step 128, the process proceeds to step 116. Otherwise, the form is forwarded for queuing without a thread ID, step 130, and presented at the agent terminal, step 132, in the same manner as an email without a thread ID in FIG. 3.

Figure 6:
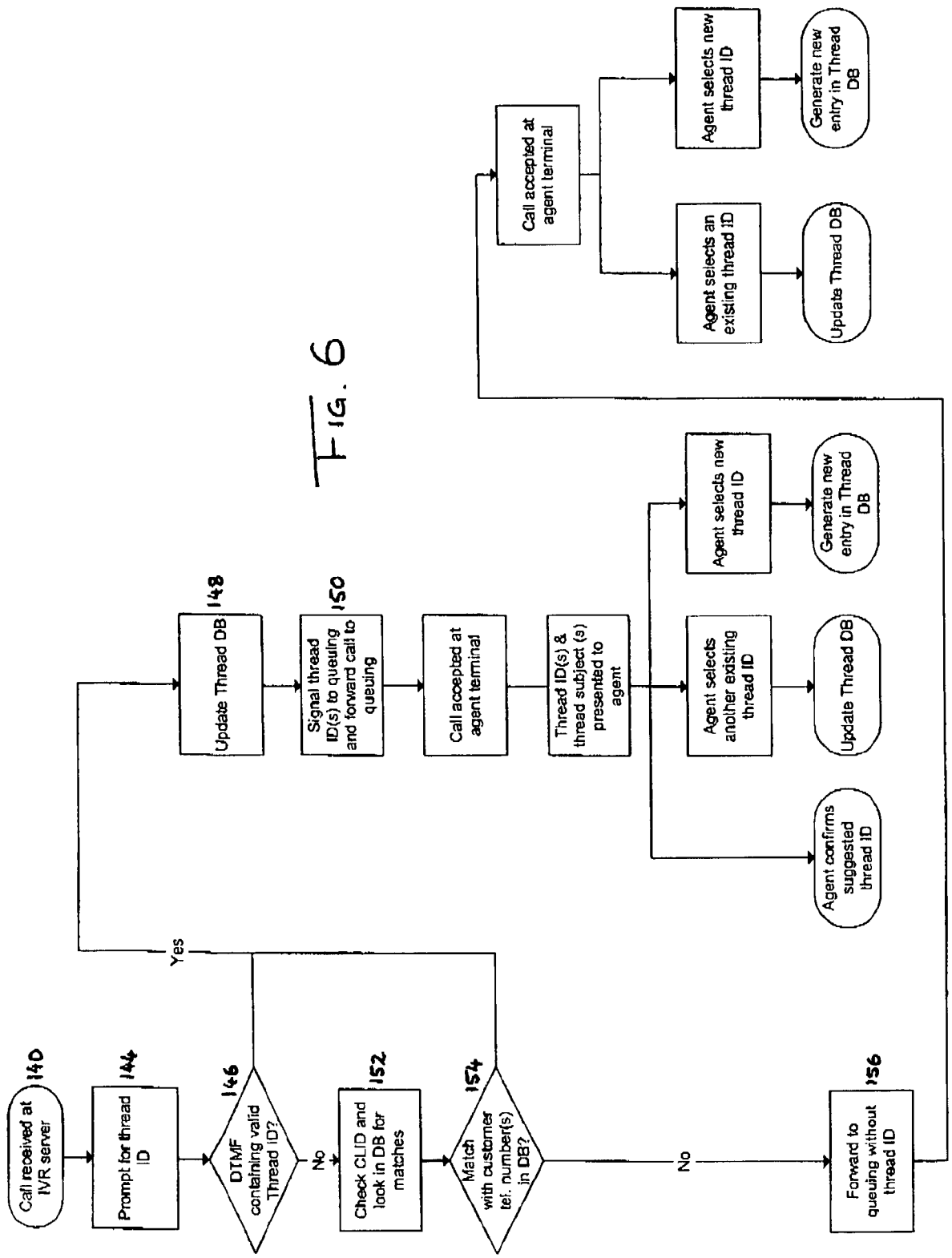
FIG. 6 illustrates a method of the invention as applied to voice call received at the call centre.

FIG. 6 illustrates an analogous process as used in relation to a call received, step 140, at the telephone interface to the call centre, call server 24 (FIG. 2). The call server has an IVR module which stores a number of pre-recorded voice messages arranged in a hierarchical menu fashion whereby the customer can select options by keypad presses or spoken words to traverse the menus. Calls may be received from the PSTN, from the Internet 14 (as voice over IP calls) or from the GSM network 18.

In this embodiment, the customer is prompted for a thread ID at an early stage of the call, step 144, and if the customer inputs a valid series of DTMF tones representative of a valid thread ID, the database entry for this thread is updated, step 148, with a pointer to the log record 64 (FIG. 4) for this call, and the thread file generator provides a thread file to the call queuing software which is presented to the agent when the call is accepted from the list of queued calls available to the agent, step 150.

Figure 7:
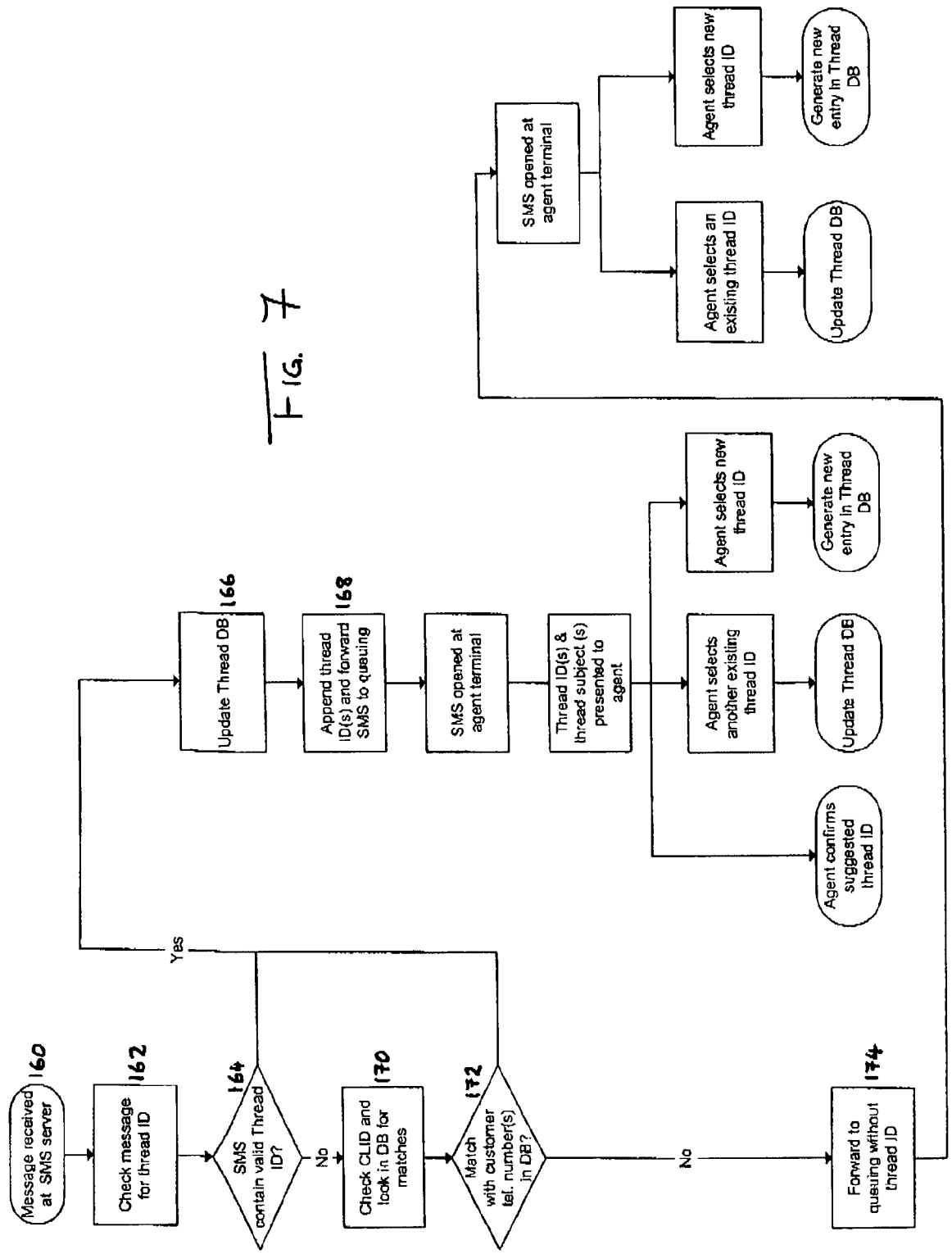
FIG. 7 illustrates a method as applied to wireless messages received at the call centre.

The agent may then confirm or change the thread ID, or select a new thread ID in the manner previously described. If no DTMF tones are detected indicating a valid thread ID in step 146, the caller line identification of the incoming caller is checked, step 152. If this matches with a customer telephone number in a thread record, then a thread match may be made and the process can proceed to step 148 (of course it is possible that a particular CLID may simply indicate that the call has emanated from a large customer organisation with too many existing threads to provide a useful indication of the likely subject of the call; again an element of discrimination can be incorporated into the search algorithm). If no match is determined, the call is forwarded for queuing without a thread ID, step 156, and when the call is accepted by an agent an existing thread ID may be assigned or a new thread ID assigned as appropriate, FIG. 7 illustrates the analogous process as applied to SMS messages received at SMS server 26, step 160. SMS server 26 receives messages of the short message service format forming part of the GSM standard. Such messages include a string of text, a time stamp, and an originating caller number.

The SMS parser 40 first checks the body of the message for a thread ID, step 162, and if such a match is found in the thread database 32, step 164, the database entry for that thread is updated, 166, and a thread file is generated and appended to the SMS message for queuing and further processing step 168. If no valid thread ID can be determined from the body of the message, the CLID (originating sender number) is checked against the database entries for matches, step 170. If a match is determined with a customer telephone number in the thread database, step 172, then the process proceeds to step 166. Otherwise the SMS message is forwarded for queuing without a thread ID, step 174, and when it is opened at the agent terminal, a thread ID can be assigned.

It should be appreciated that the while the invention has been described in relation to incoming communication, it also applies to outgoing communications. In such cases, the agent may generate an email message or place a call via the client software at the agent terminal. In doing so the agent will be prompted to select an existing thread, which can be located using the database search facility, or to assign a new thread ID to the communication. The call or email (or other communication) is logged in the appropriate archive 60, 62, and the thread database record selected or generated by the agent is updated with a pointer to the communication record in the archive.

It will also be appreciated that while various parameters for making matches have been described, such as email addresses and key words, the choice and implementation of appropriate search criteria is open to variation.

The invention is not limited to the embodiments described herein which may be varied without departing from the spirit of the invention.

What is claimed is:

1. A method of managing communications in a call centre between an agent at the call centre and a customer of the centre, comprising the steps of:
   a) maintaining a database of entries identifying a plurality of communications threads wherein each thread comprises a set of prior communications involving the call centre and related by one or more common parameters;
   b) analysing a new communication between the customer and the centre to determine a match between a parameter of the communication and one or more matching threads in the database, said match involving a parameter other than the simple identity of the customer as determined from a property of the new communication;
   c) upon determining said match, automatically presenting the agent with specific information relating to said one or more matching threads when said new communication is active at a terminal of the agent;
   d) presenting the agent with the option to create a new entry in the database identifying said new communication as a new thread; and
   e) updating the database entry relating to the or each matching thread or creating a database entry for said new thread if selected, with an identification of said new communication.

2. The method of claim 1, wherein if more than one match is determined in step b), providing the agent in step c) with a list of matches and enabling the agent to select a match whereby in step d) said communication is identified with the thread of the selected match.

3. The method of claim 1, wherein said new communication is of a communication type selected from a voice call, a facsimile, an email, a web page submission, an internet chat session, a wireless message, an interactive voice response telephone session, and a voicemail message.

4. The method of claim 3, wherein at least one of said communications threads includes communications of two or more of said communication types.

5. The method of claim 4, wherein said new communication is of a first communication type and said match is made with a thread consisting of communications of one or more of said other communication types.

6. The method of claim 3, wherein said communication type is a voice call and said parameter used to determine a match is selected from the calling line identification of an incoming call to the centre, the dialled number of an outgoing call from the agent, a sequence of DTMF tones entered by the customer during the call, and the acoustic fingerprint of the customer's voice, or a combination thereof.

7. The method of claim 3, wherein said communication is a facsimile, and wherein said parameter used to determine a match is selected from the calling line identification of an incoming call to the centre, the dialled number of an outgoing call from the agent, a sequence of DTMF tones entered by the customer during the transmission of the facsimile, and a graphical recognition of information forming part of the facsimile, or a combination thereof.

8. The method of claim 3, wherein said communication is an email, and wherein said parameter used to determine a match is selected from an email address contained in the message header, an IP address in the message header, and a distinctive identifier in the subject line of the email, or in the body of the email or in an attachment to the email message, or a combination thereof.

9. The method of claim 3, wherein said communication is a web page submission, and wherein said parameter used to determine a match is selected from an IP address recorded during the web page submission process, and a distinctive identifier entered in a field of the web page submission, or a combination thereof.

10. The method of claim 3, wherein said communication is an internet chat session, and wherein said parameter used to determine a match is selected from an IP address recorded during the session, an email address recorded during the session, and a distinctive identifier entered by a party during the session, or a combination thereof.

11. The method of claim 3, wherein said communication is a wireless message, and wherein said parameter used to determine a match is selected from the originating number of an incoming message to the centre, the dialled number of an outgoing message from the agent, a message centre number included in the message, and a distinctive identifier forming part of the message, or a combination thereof.

12. The method of claim 3, wherein said communication is an interactive voice response telephone session, and wherein said parameter used to determine a match is selected from the originating number of an incoming call to the centre, the dialled number of an outgoing call from the agent, a sequence of DTMF tones entered by the customer during the session, a distinctive selection of menu choices made by the customer during the session, and the acoustic fingerprint of the customer's voice, or a combination thereof.

13. A method of presenting communications to an agent at a terminal of a call centre, comprising the steps of:
   a) providing the agent with an incoming communication;
   b) automatically providing the agent with one or more identifiers of threads of prior communications related by one or more common parameters to the incoming communication said parameters including a parameter other than simple identity of the customer as determined from a property of the new communication; and
   c) enabling the agent to confirm or reject the association between the incoming communication and one or more of said one or more identifiers of threads, including the option to create a incoming entry in the database identifying said new communication as a new thread.

14. A method as claimed in claim 13, further comprising the step of providing the agent with the option to assign the incoming communication as the first element of a new communications thread.

15. A communications management apparatus for use in a call centre, comprising:

a) a database for recording entries identifying a plurality of communications threads wherein each thread comprises a set of prior communications involving the call centre and related by one or more common parameters;
b) a communications analysis element for analysing a new communication between the call centre and a customer of the call centre to determine a match between a parameter of the communication and one or more matching sets threads in the database, said match involving a parameter other than the simple identity of the customer as determined from a property of the new communication;
c) an agent interface provided at an agent terminal of the call centre for automatically presenting an agent at said terminal with specific information relating to said one or more matching threads when said new communication is active at said terminal;
d) said interface presenting the agent with the option to create a new entry in the database identifying said new communication as a new thread; and
e) a database management tool for updating the database entry relating to the or each matching thread or creating a database entry for said new thread if thread selected, with an identification of said new communication.

16. A computer program product comprising instructions which when executed cause a computer to implement the steps of:
   a) maintaining a database of entries identifying a plurality of communications threads wherein each thread comprises a set of prior communications involving the call centre and related by one or more common parameters;
   b) analysing a new communication between the customer and the centre to determine a match between a parameter of the communication and one or more matching threads in the database, said match involving a parameter other than the simple identity of the customer as determined from a property of the new communication;
   c) upon determining said match, automatically presenting the agent with specific information relating to said one or more matching threads when said new communication is active at a terminal of the agent;
   d) presenting the agent with the option to create a new entry in the database identifying said new communication as a new thread; and
   e) updating the database entry relating to the or each matching thread or creating a database entry for said new thread if selected, with an identification of said new communication.

17. A computer program product as claimed in claim 16, wherein the execution of said instructions is distributed between a plurality of connected computers.

18. A multimedia call centre comprising:
   a) a plurality of agent terminals each for receiving and processing communications of two or more media types;
   b) a communications distribution system for assigning or presenting communications of said two or more types to said terminals;
   c) a communications channel for each of said media types enabling communications between agents at said terminals and remote customers of the call centre, and
   d) a communications management apparatus, comprising:
   i) a database for recording entries identifying a plurality of communications threads wherein each thread comprises a set of prior communications involving the call centre and related by one or more common parameters;

ii) a communications analysis element for analysing a new communication between the call centre and a customer of the call centre to determine a match between a parameter of the communication and one or more matching threads in the database, said match involving a parameter other than the simple identity of the customer as determined from a property of the new communication;

iii) an agent interface provided at one or more of said agent terminals for automatically presenting an agent at a terminal with specific information relating to said one or more matching threads when said new communication is active at said terminal;

iv) said interface presenting the agent with the option to create a new entry in the database identifying said new communication as a new thread; and v) a database management tool for updating the database entry relating to the or each matching thread or creating a database entry for said new thread if selected, with an identification of said new communication.

* * * * *